United States Patent
Hoover et al.

(10) Patent No.: US 7,975,607 B2
(45) Date of Patent: Jul. 12, 2011

(54) SIDE TENSION RAILS TO CONTROL BALE LENGTH VARIATION IN A SQUARE BALE CHAMBER

(75) Inventors: Larry L. Hoover, Landisville, PA (US); Stephen W. Jacobs, Lititz, PA (US)

(73) Assignee: CNH America LLC, New Holland, PA (US)

( * ) Notice: Subject to any disclaimer, the term of this patent is extended or adjusted under 35 U.S.C. 154(b) by 172 days.

(21) Appl. No.: 12/398,233

(22) Filed: Mar. 5, 2009

(65) Prior Publication Data

US 2010/0224085 A1 Sep. 9, 2010

(51) Int. Cl.
*B30B 9/30* (2006.01)
(52) U.S. Cl. ........................................................ 100/191
(58) Field of Classification Search .................. 100/147, 100/148, 179, 191, 192; 56/341
See application file for complete search history.

(56) References Cited

U.S. PATENT DOCUMENTS

| | | | |
|---|---|---|---|
| 2,470,278 A | 5/1949 | West et al. | |
| 2,823,603 A | 2/1958 | Collins | |
| 3,024,719 A | 3/1962 | Englund | |
| 3,294,013 A | 12/1966 | Seltzer | |
| 3,350,999 A | 11/1967 | Morse | |
| 3,895,571 A | 7/1975 | Freeman | |
| 4,037,528 A * | 7/1977 | White et al. | 100/191 |
| 4,125,071 A * | 11/1978 | Young | 100/191 |
| 4,354,430 A | 10/1982 | Horiuchi | |
| 4,489,648 A | 12/1984 | Naaktgeboren | |
| 4,750,418 A * | 6/1988 | Naaktgeboren | 100/50 |
| 5,735,199 A * | 4/1998 | Esau et al. | 100/191 |
| 5,819,643 A * | 10/1998 | McIlwain et al. | 100/43 |
| 6,698,343 B2 | 3/2004 | Chassiboud | |

FOREIGN PATENT DOCUMENTS

GB 972562 10/1964

* cited by examiner

*Primary Examiner* — Jimmy T Nguyen
(74) *Attorney, Agent, or Firm* — Patrick M. Sheldrake; Michael G. Harms

(57) ABSTRACT

An improved mechanism for controlling the pressure applied by the side walls of a square bale chamber comprising two independently positionable opposing pairs of bale tension rails, each pair perpendicularly arranged with respect to each other, whereby a uniform pressure may be exerted on all four sides of the bale in the bale chamber thereby resulting in improved consistency in bale length, density, shape, and appearance.

12 Claims, 4 Drawing Sheets

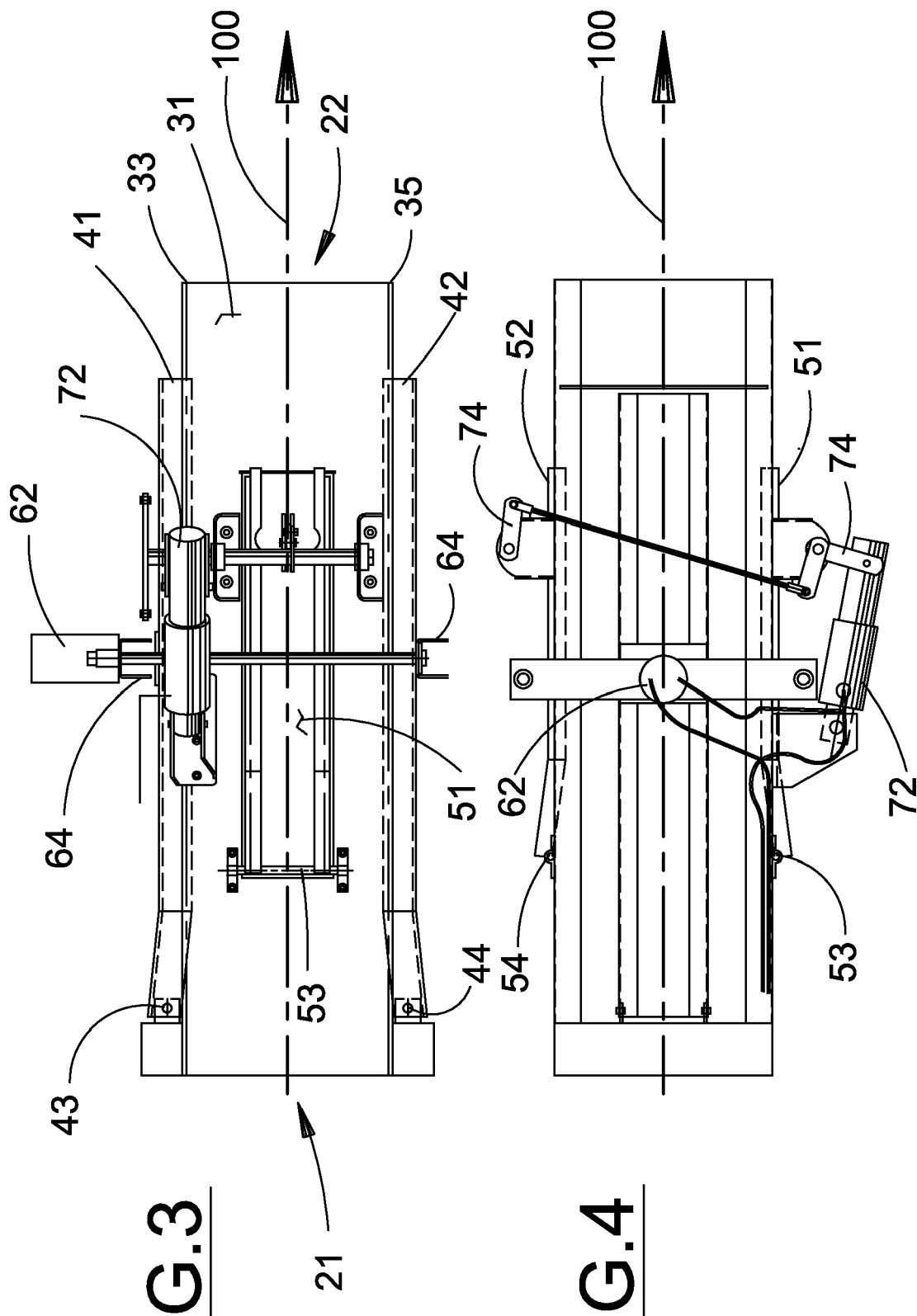

SIDE TENSION RAILS TO CONTROL BALE LENGTH VARIATION IN A SQUARE BALE CHAMBER

BACKGROUND OF THE INVENTION

This invention relates generally to agricultural balers of the type commonly referred to as square balers that produce bales having a rectangular cross section, and more particularly to an apparatus for consistently controlling the length of bales produced by small square balers.

Square balers are implements that pick up a swath or windrow of crop material, such as straw or hay, from the ground and deposit it in an infeed housing where it is conveyed by a feed mechanism through an inlet to a bale forming chamber. Four walls define the bale forming chamber where the crop material is urged rearwardly by a reciprocating plunger to form a rectangular package of compacted crop material. The package so formed is automatically tied by a tying mechanism to complete the bale that is then discharged from the chamber by being urged rearwardly by the next bale being successively formed. Completed bales are either deposited on the ground for subsequent retrieval or they are delivered by appropriate means to a trailing wagon hitched to the back of the baler.

Pressure for increased efficiency in agricultural operations has led to increased usage of labor saving machinery to receive completed bales from the baler. Bale accumulator systems are one such machine commonly used in connection with small square bales. Use of such equipment has increased the demand on the baler to provide greater consistency in bale length so that the bale handling equipment will operate efficiently.

As crop is fed into a baler, each plunger stroke creates what is referred to as a wad or slice. The thickness and density of each slice is directly influenced by the amount of crop material delivered to the plunger for each stroke and the resistance applied to the bale being formed in the chamber behind the plunger. Resistance applied to the bale in the chamber is commonly controlled by variations in the size of the cross section of the chamber through which the crop material is being urged by the plunger by adjusting the position of one or more of the chamber side walls to vary the orifice through which the crop material is extruded. To this end, moveable tension rails, which define a portion of one or more of the walls of the chamber, are used to change the dimensions, i.e., the height and/or the width, of the chamber into which the crop material is being urged. Movement of the tension rails is accomplished by spring or hydraulic means.

Typically only the position of a pair of opposing bale chamber walls is varied in order to alter the bale chamber cross-sectional area. A linkage interconnects the walls so that a single actuator can control movement of the bale chamber walls. Balers having provisions for moving all four bale chamber walls generally incorporate a more complex linkage that enables a single actuator to reposition all four walls simultaneously or are otherwise configured to coordinate simultaneous movement of all four bale chamber walls. The result in many cases is that unequal pressure is exerted on the sides of the bale which results in inconsistent bale length and density.

It would be a great advantage to provide an improved bale chamber tensioning mechanism that would allow independent movement of opposing side walls of a bale chamber thus enabling uniform pressure to be applied to all four side planes of the bale being formed in the chamber thereby overcoming the above problems and disadvantages.

SUMMARY OF THE INVENTION

Accordingly, it is an object of the present invention to provide an improved mechanism for controlling bale movement in a bale chamber whereby consistent pressure is applied on all four sides of a bale exiting the baler in order to optimize movement of a bale being formed in the bale chamber.

It is a further object of the present invention to provide an improved mechanism for controlling the movement of a bale in a bale forming chamber that utilizes contoured guide rails to produce a zone of initially higher resistance to improve initial bale formation thus enabling higher bale density, and a zone of comparatively lower, but consistent resistance to maintain higher bale density and improve bale uniformity.

It is a further object of the present invention to provide an improved mechanism for controlling guide wall pressure on the bale chamber in a small square baler that incorporates an additional, independently movable pair of guide rails.

It is a further object of the present invention to provide an improved mechanism for controlling the position of a plurality of planar guide rails for a small square baler that incorporates two independently positionable actuators, one for positioning a first pair of opposing side rails, the other for positioning a second pair of opposing side rails wherein the first pair is perpendicularly oriented to the second pair.

It is a further object of the present invention to provide an improved mechanism for controlling the position of a plurality of planar guide rails for a small square baler that enables a first pair of opposing side rails to be positioned independently of a second pair of opposing side rails wherein the first pair of guide rails is perpendicularly oriented to the second pair of guide rails.

It is a still further object of the present invention to provide an improved mechanism for positioning the guide rails defining the planar sides of a square bale chamber wherein the guide rails are positionable by manual or hydraulic means to exert a consistent force on the exterior surfaces of a bale exiting the bale forming chamber.

It is a still further object of the present invention to provide independently positionable planar guide rails in a small square baler having an actuator mechanism capable of applying uniform pressure on all four guide rails thereby assuring a uniform pressure distribution on all side of the bale being formed and resulting in improved bale density, length, shape, and appearance.

It is a still further object of the present invention to provide an improved mechanism for controlling the force applied on the guide rails in a small square baler that is durable in construction, inexpensive of manufacture, carefree of maintenance, easily assembled, and simple and effective to use.

These and other objects are achieved by providing an improved mechanism for controlling the pressure applied by the side walls of a square bale chamber comprising two independently positionable opposing pairs of bale tension rails, each pair perpendicularly arranged with respect to each other, whereby a uniform pressure may be exerted on all four sides of the bale in the bale chamber thereby resulting in improved consistency in bale length, density, shape, and appearance.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 presents a side elevation view of the bale case showing the upper and lower tension rails and one of the side tension rails of the present invention;

FIG. 4 presents a plan view of the bale case shown in FIG. 3 showing the orientation of the side tension rails relative to the bale case side walls.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
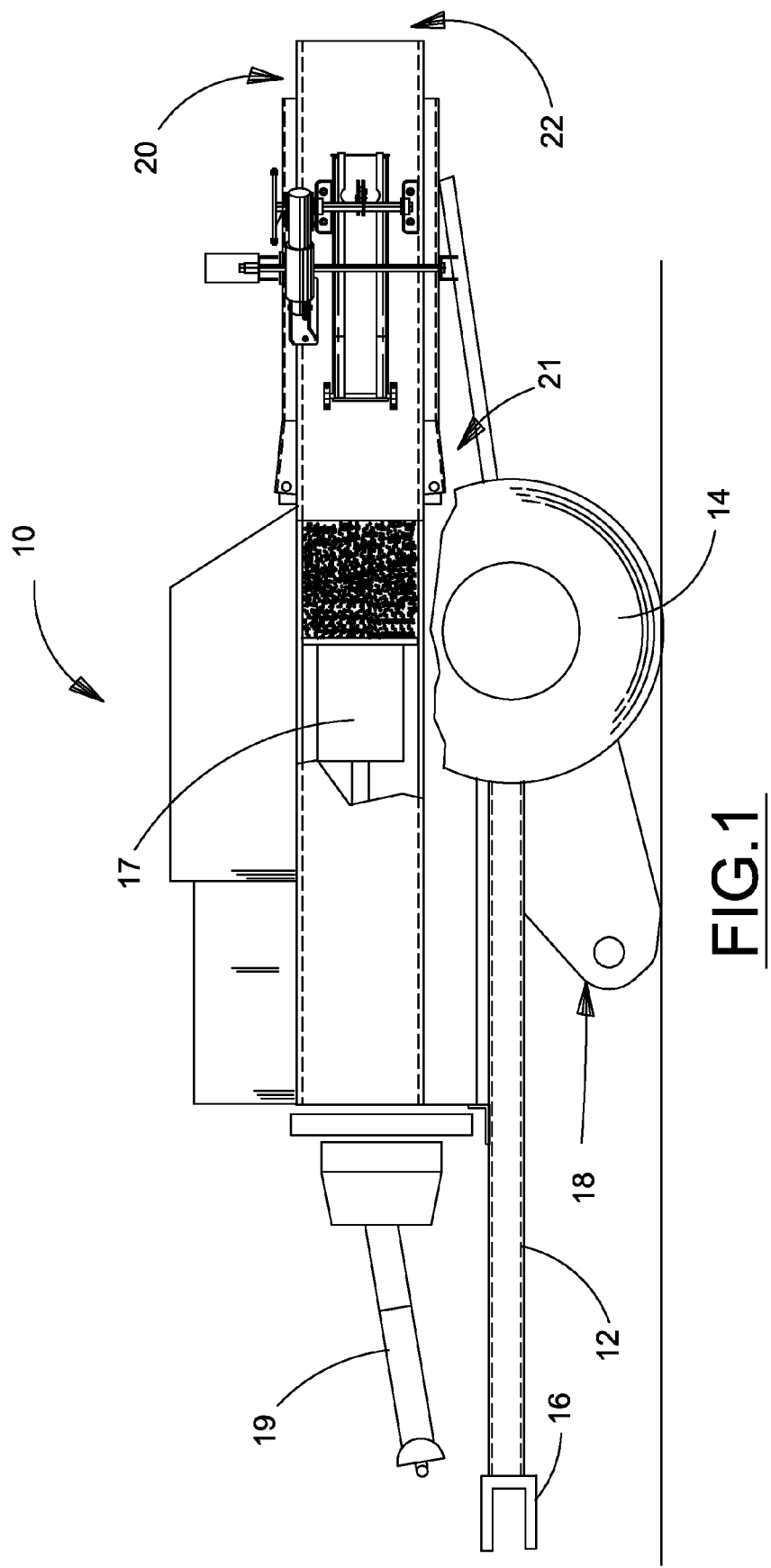
FIG. 1 is a side view of a typical small square baler having an adjustable bale chamber of the type on which the present invention is useful.

FIG. 1 shows a baler 10 for producing oblong bales (shown as 90 in FIG. 5) having generally rectangular cross-sections, generally referred to as small, square bales. The baler 10 includes a frame 12 that is ground-supported by wheels 14 (only one shown). A tongue 16 projects forwardly from the frame 12 and is configured for connection to a towing vehicle, such as an agricultural tractor (not shown), which is equipped with a power take-off shaft 19 for delivering motive power to the various driven components in the baler 10. A pick-up 18 is provided in order to take up a swath or windrow of harvested crop from the ground and to deliver it toward the bale case 20. The bale case 20 includes a forward portion 21 and a rearward portion 22. A plunger 17 is reciprocally disposed adjacent to the forward portion 21 of bale case 20 to form crop material into square bales in a conventional manner. These square bales are urged sequentially through the bale case 20, bound with a suitable material such as twine (shown as 92 in FIG. 5), and then discharged from the baler 10.

Figure 2:
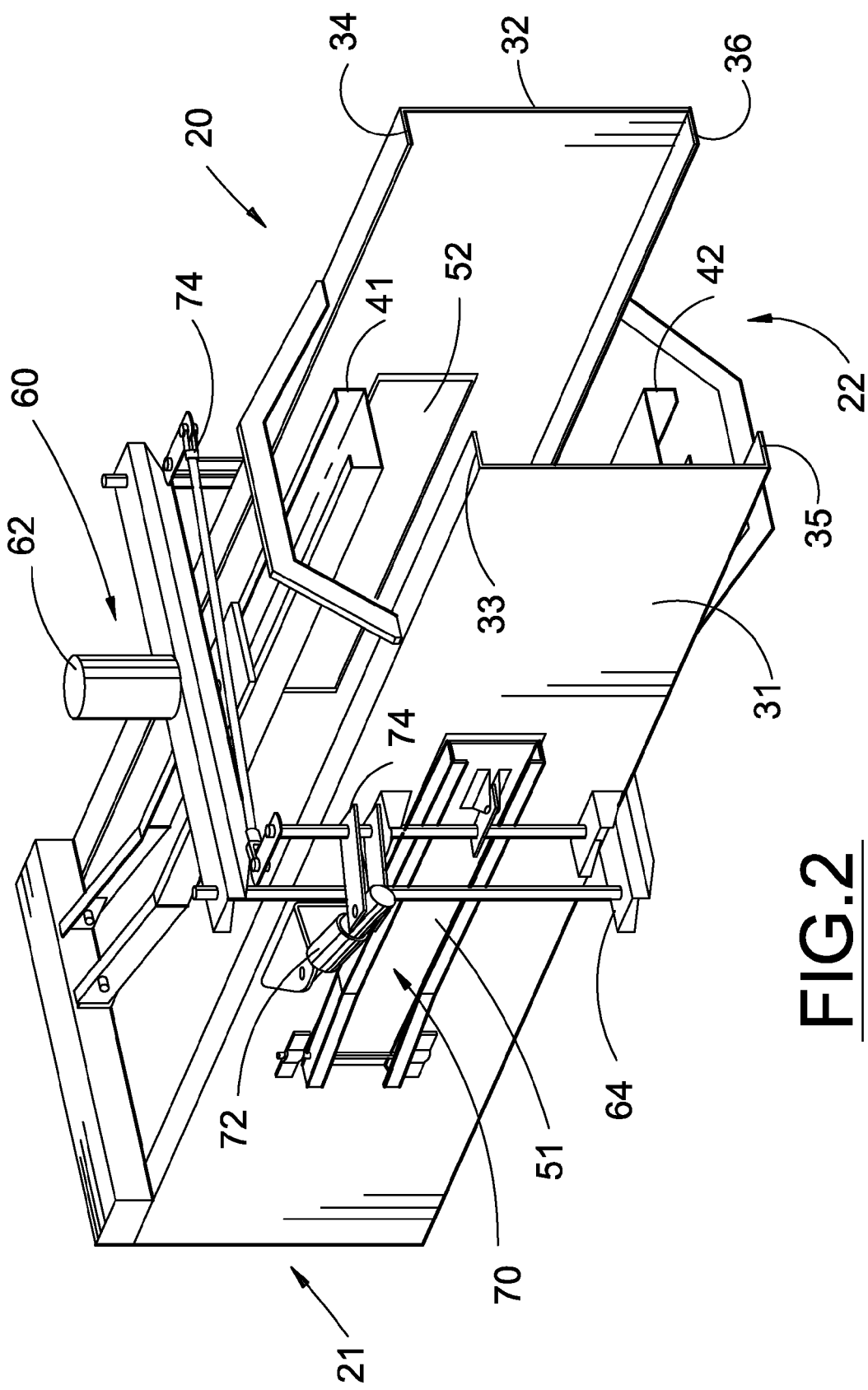
FIG. 2 is an enlarged rear perspective view of the baler of FIG. 1 detailing the adjustable bale chamber having one embodiment of the present invention.

Referring now to FIG. 2, the bale case 20 is further defined by a pair of generally opposing and parallel sides 31, 32, each bounded by angle-shaped upper corner rails 33, 34 and lower corner rails 35, 36 to form a generally rectangular opening through which bales pass forwardly to rearwardly along a bale travel axis (shown as axis 100 in FIGS. 3 and 4). The rectangular shape of bale case 20 generally establishes the cross-sectional rectangular size of the bale. Sides 31, 32 and upper and lower corner rails 33, 34, 35, 36 are typically fixed with respect to frame 12, but may include provisions for adjusting the size of the bale case. Bale case 20 is further defined by an opposing upper tension rail 41 and lower tension rail 42. The elongate upper and lower tension rails 41, 42 are oriented along the upper and lower sides of the bale case, generally parallel to the forward-rearward bale travel axis 100 of the bale chamber 20, and pivotally connected adjacent to their forward-most ends to the baler frame. The upper and lower tension rails 41, 42 are connected to a vertical positioner mechanism 60 that interconnects the baler frame and the upper and lower tension rails 41, 42 in a manner that pivots the tension rails in a coordinated and simultaneous manner to move the rearward ends of the tension rails inwardly into the bale case or outwardly from the bale case as a means of adjusting the effective height of the bale case and hence the resistance to movement applied to the top and bottom surfaces of a bale moving through the bale case. Upper and lower tension rails may substantially form the upper and lower surfaces of the bale case, or may protrude into the bale case through openings provided in the upper and lower surface of the bale case in designs featuring four planar walls to define the bale case. Vertical positioner mechanism 60 includes a vertical actuator 62, typically a hydraulic cylinder, and a linkage 64 interconnecting the upper and lower tension rails so that movement of the hydraulic cylinder is translated into coordinated movement of the upper and lower guide rails 41, 42. A manually operated mechanical actuator 62, such as a screw adjuster mechanism or the like, may also be provided in lieu of a hydraulic cylinder.

The bale case of the present invention is also further defined by a pair of generally opposing side tension rails 51, 52, one disposed on each vertical side 31, 32 of the bale case. Similar to the upper and lower tension rails, the elongate side tension rails 51, 52 are also oriented along the sides of the bale case, generally parallel to the forward-rearward bale travel axis 100 of the bale chamber 20 and pivotally connected adjacent to their forward-most ends to the side walls or the baler frame. The side tension rails 51, 52 are connected to a side positioner mechanism 70 that interconnects the baler frame and the side tension rails 51, 52 in a manner that pivots the tension rails in a coordinated and simultaneous manner inwardly into the bale case or outwardly from the bale case as a means of adjusting the effective width of the bale case and hence the resistance to movement applied on the sides of a bale moving through the bale case. Side positioner mechanism 70 also includes a side actuator 72, typically a hydraulic cylinder, and a linkage 74 interconnecting the right 52 and left side tension rails 51 so that movement of the hydraulic cylinder is translated into coordinated movement of the side tension rails. As with the vertical actuator 62, a manually operated mechanical side actuator 72, such as a screw adjuster mechanism or the like, may also be provided in lieu of a hydraulic cylinder.

Side tension rails 51, 52 work in conjunction with upper and lower tension rails 41, 42 to apply pressure to all four sides of a bale as it is moved through the base case by action of the plunger. While movement of the upper and lower tension rails coordinated by their respective interconnecting linkage, and movement of the side tension rails is coordinated by their respective linkage, there is no linkage interconnecting the linkage for the upper/lower tension rails 41, 42 and the linkage for the side tension rails 51, 52. Thus the upper and lower tension rails 41, 42 may be moved independently from the side tension rails 51, 52, even though both pairs may be moved at the same time; there is no fixed relationship between to their respective movements. In one embodiment, vertical actuator 62 and side actuator 72, both being hydraulic cylinders, are hydraulically connected in a manner such that all four tension rails apply approximately equal pressure on the respective sides of the bale in the base case. Application of generally equal pressure on all four sides of the bale improves consistency in bale density and length as well as improving the general appearance of the completed bale.

Figure 5:
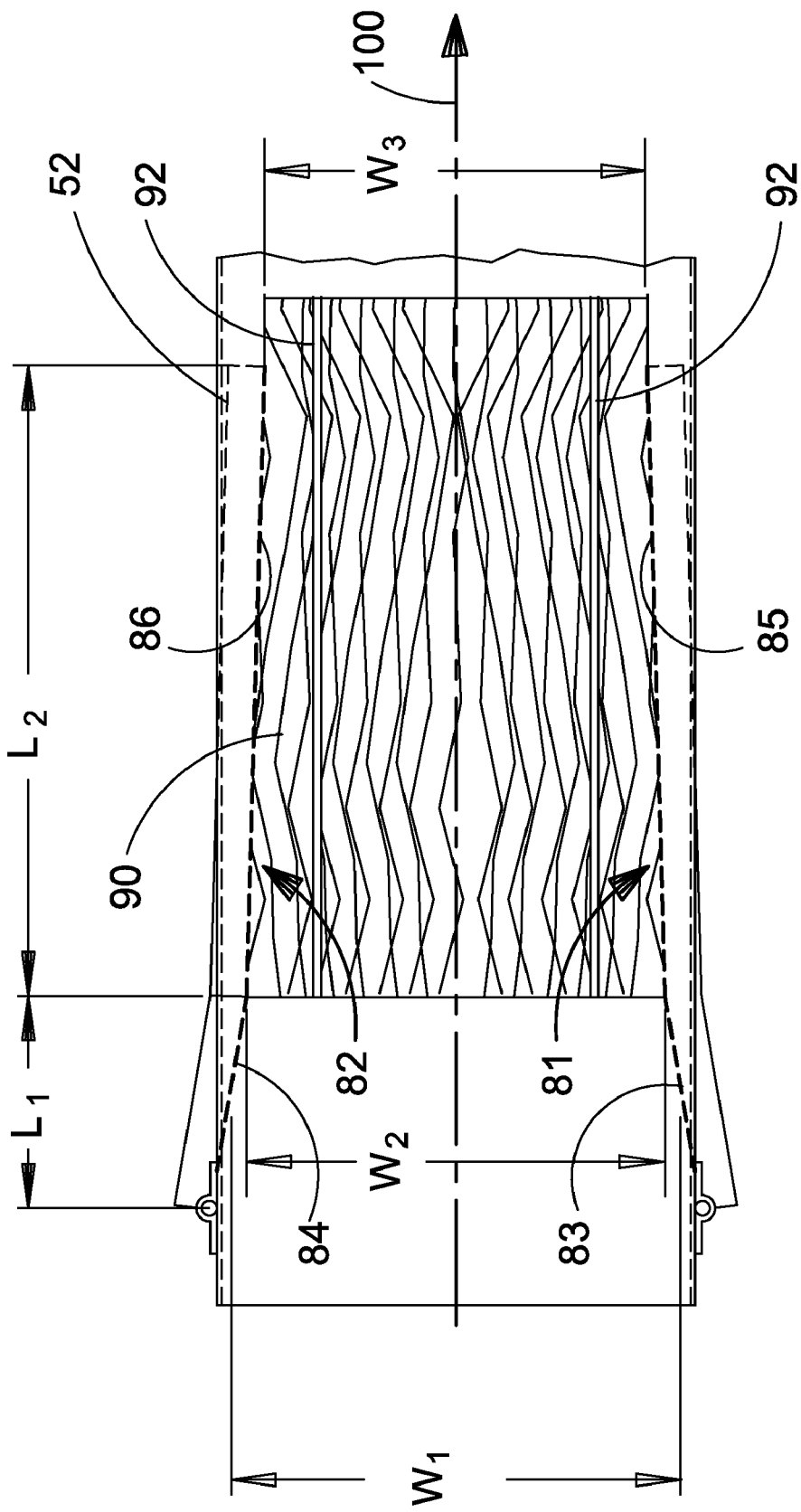
FIG. 5 shows a plan view of the bale case of FIG. 4 illustrating the change in bale case width enabled by the side tension rails of the present invention.

Referring specifically to FIG. 3, the configuration of the upper and lower tension rails 41, 42 is shown to include a transverse bend in each rail surface facing the bale case that is oriented generally perpendicularly to the longitudinal axis of each rail. FIG. 5 presents a view of the side tension rails, but may be referred to in conjunction with FIG. 3 to illustrate the configuration of the transverse bend in the upper and lower tension rails as well. The result of the transverse bend is the creation of generally planar first zones 83, 84 in the inwardly facing surfaces 81, 82 of the tension rails which are adjacent to the pivot points 53, 54 (as shown in FIG. 5, respectively; corresponding to pivots points 43, 44 on the upper and lower tension rails) and extending rearwardly for a distance L1. The generally planar surfaces of first zones 83, 84 are angularly disposed relative to the generally planar surfaces of second zones 85, 86 on the rails. The surfaces of second zones 85, 86 extend rearwardly from the transverse bend to the end of the tension rails, shown as distance L2. The relationship of the angled first zones 83, 84 and second zones 85, 86 with reference to the bale travel axis 100 is such that the first zones 83, 84 are more greatly angled relative to the axis 100 that are the second zones 85, 86. As the upper and lower tension rails are pivotally positioned with respect to the bale case, the angled relationship between the first and second zones creates a first portion in the bale case in which the cross sectional area of the bale case, defined by the upper and lower tension rails, is decreasing from W1 to W2 at a greater rate as a bale travels through the bale case than the rate of change in cross-sectional area experienced by the bale travelling through the second zone, shown as the difference between W2 and W3.

Similarly, FIGS. 4 and 5 show the configuration of the side tension rails 51, 52, and specifically the tension rail surfaces 81, 82 that contact the exterior surface of the bale. Each side tension rail 51, 52 also includes a transverse bend similar to that of the upper and lower tension rails 41, 42. The result is the creation of a generally planar first zone 83, 84 which is adjacent to the pivot points 53, 54, respectively, and which is angularly disposed relative to the generally planar second zones 85, 86 on the rails. As the side tension rails 51, 52 are pivotally positioned with respect to the bale case, the angled relationship between the first and second zones creates a first portion in the bale case, indicated as L1, generally coinciding with the similar first portion created by the converging first zone of the upper and lower tension rails. In this first zone, the cross sectional area of the bale case, now defined by the upper and lower tension rails as well as the side tension rails, is decreasing at a greater rate as a bale travels through the bale case than the rate of change in cross-sectional area experienced by the bale travelling through the second zone. This first zone, occurring generally in length L1, of higher tension rail convergence creates a wedge effect at the rear of the bale forming area, providing increased resistance against which the plunger may compress the crop material to form the bale. The less constrictive second zone maintains sufficient pressure on the bale surface to maintain a desirable resistance on the bale.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A mechanism for applying a uniform tension to a bale in the bale case of an agricultural baler, the bale case having four sides defining a generally rectangular opening through which a bale is urged along a bale travel axis from a forward end toward a rearward end, said mechanism comprising:
    a first pair of elongate tension rails arranged along two opposing sides of the bale case, each of said first pair of tension rails being pivotally connected at one end adjacent to the forward end of the bale case and extending rearwardly therefrom in a manner to allow said first pair of tension rails to be selectively pivoted inwardly and outward relative to the bate travel axis;
    a second pair of elongate tension rails arranged along two opposing sides of the bale case generally perpendicularly oriented to said first pair of tension rails, each of said second pair of tension rails being pivotally connected to the bale case and extending rearwardly therefrom in a manner to allow said second pair of tension rails to be selectively pivoted inwardly and outward relative to the bale travel axis;
    a first positioner mechanism connected to said first pair of tension rails for simultaneously moving said first pair inwardly or outwardly with respect to the bale travel axis;
    a second positioner mechanism separate from said first positioned mechanism connected to said second pair or tension rails for simultaneously moving said second pair inwardly or outwardly with respect to the bale travel axis, wherein said first positioner mechanism and said second positioner mechanism enable selective and independent positioning of said first pair of tension rails and said second pair of tension rails, respectively, to apply a pressure on the sides of a bale in the bale case; and
    wherein said first pair of tension rails and said second pair of tension rails each have an offset bend oriented generally parallel to respective said pivotal connections and rearwardly displaced therefrom said offset bend in each said tension rail creating a generally planar first surface and and generally planar second surface wherein said first and second surfaces are angled with respect to each other, the offset bends of said second pair of tension rails located rearward alone the bale travel axis from the offset bends of the first pair of elongate tension rails, and wherein pivotal connections of the second pair of tension rails are located rearward along the bale travel axis from pivotal connections of the first pair of tension rails.

2. The mechanism as described in claim 1, wherein a first angle between each said first surface and the bale travel axis is greater than a second angle between each said second surface and the bale travel axis.

3. The mechanism as described in claim 2, wherein said first positioner mechanism further comprises a first linkage interconnecting said first pair of tension rails configured to provide coordinated, simultaneous movement of each tension rail relative to the bale travel axis, and a first actuator connected to said first linkage for selectively positioning said first pair of tension rails; and
    said second positioner mechanism further comprising a second linkage interconnecting said second pair of tension rails configured to provide coordinated, simultaneous movement of each tension rail relative to the bale travel axis, and a second actuator connected to said second linkage for selectively positioning said second pair of tension rails.

4. The mechanism as described in claim 1, wherein the second pair of tension rails are located within left and right side walls of the bale case.

5. The mechanism as described in claim 3, wherein said first and second actuators are hydraulic actuators.

6. The mechanism as described in claim 5, wherein said first and second hydraulic actuators are hydraulically connected in a manner to enable uniform pressure to be simultaneously applied to the sides of a bale in the bale case by said first and second pairs of tension rails.

7. A mechanism for controlling the tension applied to the sides of a bale in a bale case of an agricultural baler, the bale case having four sides defining a generally rectangular opening, a forward end, and a generally opposing rearward end with a generally horizontal bale travel axis extending therebetween, said mechanism comprising:

an elongate upper tension rail and an elongate lower tension rail disposed on upper and lower sides of the bale case, respectively, each said rail pivotally connected at one end adjacent to the forward end of the bale case and extending rearwardly therefrom in a manner to allow said upper and lower tension rails to be selectively pivoted inwardly and outwardly relative to the bale travel axis;

elongate first and second side tension rails disposed on opposing sides of the bale case generally perpendicularly to said upper and lower tension rails, said first and second side tension rails each pivotally connected to the bale case and extending rearwardly therefrom in a manner to allow said first and second side tension rails to be selectively pivoted inwardly and outwardly relative to the bale travel axis;

a first positioner mechanism for selectively pivoting said upper and said lower tension rails; and a second positioner mechanism, separate from said first positioner mechanism, for selectively pivoting said first and second side tension rails;

wherein said upper and lower tension rails are connected for coordinated movement simultaneously inwardly or outwardly with respect to the bale travel axis to selectively manage the pressure applied to upper and lower side surfaces of a bale in the bale case, and said first and second side tension rails are connected for coordinated movement simultaneously inwardly or outwardly relative to the bale travel axis, movement and position of said upper and lower tension rails being independent of the movement and position of said first and second side tension rails to selectively manage the pressure applied to opposing side surfaces of a bale in the bale case; and wherein said upper and lower tension rails and said first and second side tension rails each have an offset bend oriented generally parallel to respective said pivotal connections and rearwardly displaced therefrom, said offset bend in each said tension rail creating a generally planar first surface and a generally planar second surface wherein said first and second surfaces are angled with respect to each other, the offset bend of said first and second side tension rails located rearward along the bale travel axis from the offset bends of the upper and lower elongate tension rails, and wherein pivotal connections of the first and second side tension rails are located rearward along the bale travel axis from pivotal connections of the upper and lower elongate tension rails.

8. The mechanism as described in claim 4, wherein a first angle between each said first surface and the bale travel axis is greater than a second angle between each said second surface and the bale travel axis.

9. The mechanism as described in claim 8, wherein said first positioner mechanism further comprises a first linkage interconnecting said upper and lower tension rails and is further configured to provide coordinated, simultaneous movement of each tension rail relative to the bale travel axis, and a first actuator connected to said first linkage for selectively positioning said upper and lower tension rails; and said second positioner mechanism further comprising a second linkage interconnecting said first and second side tension rails and further configured to provide coordinated, simultaneous movement of each side tension rail relative to the bale travel axis, and a second actuator connected to said second linkage for selectively positioning said first and second side tension rails.

10. The mechanism as described in claim 7, wherein the first and second side tension rails are mounted to left and right side walls of the bale case.

11. The mechanism as described in claim 9, wherein said first and second actuators are hydraulic actuators.

12. The mechanism as described in claim 11, wherein said first and second hydraulic actuators are hydraulically connected in a manner to enable uniform pressure to be simultaneously applied to the sides of a bale in the bale case by said upper and lower tension rails and said first and second side tension rails.

* * * * *